(12) United States Patent
Machovina et al.

(10) Patent No.: US 12,241,244 B2
(45) Date of Patent: Mar. 4, 2025

(54) PORTABLE AIR FILTRATION ASSEMBLY FOR TOILETS

(71) Applicants: Brian L. Machovina, Coral Gables, FL (US); Eileen McHale, Avon Lake, OH (US)

(72) Inventors: Brian L. Machovina, Coral Gables, FL (US); Eileen McHale, Avon Lake, OH (US)

(73) Assignee: Hound Tech LLC, Westlake, OH (US)

(*) Notice: Subject to any disclaimer, the term of this patent is extended or adjusted under 35 U.S.C. 154(b) by 79 days.

(21) Appl. No.: 17/968,731

(22) Filed: Oct. 18, 2022

(65) Prior Publication Data
US 2023/0250623 A1 Aug. 10, 2023

Related U.S. Application Data

(60) Provisional application No. 63/307,330, filed on Feb. 7, 2022.

(51) Int. Cl.
*E03D 9/052* (2006.01)
*B01D 46/00* (2022.01)
*B01D 46/42* (2006.01)

(52) U.S. Cl.
CPC ......... *E03D 9/052* (2013.01); *B01D 46/0028* (2013.01); *B01D 46/0038* (2013.01);
(Continued)

(58) Field of Classification Search
CPC ............... E03D 9/052; B01D 46/0028; B01D 46/0038; B01D 46/0047; B01D 46/4245;
(Continued)

(56) References Cited

U.S. PATENT DOCUMENTS

| | | |
|---|---|---|
| 2,238,461 A | 11/1939 | Carman |
| 3,066,317 A | 12/1962 | Cawiezel |

(Continued)

FOREIGN PATENT DOCUMENTS

| | | | | |
|---|---|---|---|---|
| CA | 2709045 | | 1/2012 | |
| CA | 2943135 A1 | * | 3/2017 | ........... A47K 13/307 |
| CN | 105507397 A | | 12/2017 | |
| CN | 212506590 | | 2/2021 | |

(Continued)

OTHER PUBLICATIONS

Capelli et al., Measuring Odours in the Environment vs. Dispersion Modelling: a Review, Jul. 15, 2013.
(Continued)

*Primary Examiner* — Lori L Baker
(74) *Attorney, Agent, or Firm* — Tucker Ellis LLP

(57) ABSTRACT

A portable assembly for filtering toilet bowl odors and aerosolized toilet waste which includes a housing, preferably having a removably connected first section and second section. When utilized, the housing is disposed adjacent a toilet bowl and including an inlet and an outlet. In use, the inlet is disposed in direct fluid communication with an interior of the toilet bowl and a filter assembly is disposed within housing in fluid communication with inlet. A fan assembly within the housing includes an electrical power source and is operative to direct fluid flow successively through and from said inlet, downstream through the filter assembly and therefrom to a housing exterior through the outlet, concurrent to activation of the fan assembly.

18 Claims, 3 Drawing Sheets

(52) U.S. Cl.
CPC ..... *B01D 46/0047* (2013.01); *B01D 46/4245* (2013.01); *B01D 2279/65* (2013.01)

(58) Field of Classification Search
CPC .......... B01D 2279/65; B01D 2253/102; B01D 53/0407; B01D 2257/90; B01D 2259/4508; B01D 2259/4541; A47K 13/307
USPC .............................. 4/209, 219, 306, 347, 477
See application file for complete search history.

(56) References Cited

U.S. PATENT DOCUMENTS

| | | | |
|---|---|---|---|
| 3,386,109 A | 6/1968 | Christian et al. | |
| 3,491,382 A | 1/1970 | Poister | |
| 3,763,505 A | 10/1973 | Zimmerman | |
| 3,849,808 A | 11/1974 | Olson et al. | |
| 4,117,559 A | 10/1978 | Boyle | |
| 4,375,704 A | 3/1983 | Smith | |
| 4,472,841 A | 9/1984 | Faulkner | |
| 4,726,078 A | 2/1988 | Carballo et al. | |
| 4,876,748 A | 10/1989 | Chun | |
| 4,944,045 A * | 7/1990 | Agelatos | E03D 9/052 4/213 |
| 5,044,325 A | 9/1991 | Miksitz | |
| 5,273,487 A | 12/1993 | Dauvergne | |
| 5,333,321 A | 8/1994 | Redford | |
| 5,345,617 A | 9/1994 | Jahner et al. | |
| 5,454,122 A | 10/1995 | Bergeroen | |
| 5,488,741 A * | 2/1996 | Hunnicutt, Jr. | E03D 9/052 4/352 |
| 5,555,572 A * | 9/1996 | Hunnicutt, Jr. | E03D 9/052 4/352 |
| 5,564,364 A | 10/1996 | Kovacs et al. | |
| 5,671,484 A | 9/1997 | Lee, III | |
| 5,681,533 A | 10/1997 | Hiromi | |
| 5,727,262 A | 3/1998 | Littlejohn | |
| 5,778,822 A | 7/1998 | Giffin et al. | |
| 6,003,157 A | 12/1999 | Bruyere | |
| 6,233,750 B1 | 5/2001 | Donald et al. | |
| 6,260,214 B1 | 7/2001 | Smith | |
| 6,279,173 B1 | 8/2001 | Denzin et al. | |
| 6,312,507 B1 | 11/2001 | Taylor et al. | |
| 6,313,371 B1 | 11/2001 | Conant et al. | |
| 6,449,778 B1 | 9/2002 | Franco | |
| 6,457,186 B1 | 10/2002 | Stewart | |
| 6,494,940 B1 | 12/2002 | Hak | |
| 6,546,567 B2 | 4/2003 | Kuzniar | |
| 6,588,025 B1 | 7/2003 | Helmolt | |
| 6,610,121 B2 | 8/2003 | Chasen | |
| 6,643,850 B2 | 11/2003 | Chasen et al. | |
| 6,678,900 B2 | 1/2004 | Ware | |
| 6,701,538 B2 | 3/2004 | Hunnicutt, Jr. et al. | |
| 6,760,928 B1 | 7/2004 | Rodriguez | |
| 6,834,530 B2 | 12/2004 | Kita et al. | |
| 6,848,989 B2 | 2/2005 | Miyazaki et al. | |
| 7,073,223 B2 | 7/2006 | Huza | |
| 7,076,371 B2 | 7/2006 | Fu | |
| 7,166,259 B2 | 1/2007 | Beam et al. | |
| 7,222,494 B2 | 5/2007 | Peterson et al. | |
| 7,326,387 B2 | 2/2008 | Arts et al. | |
| 7,347,888 B2 | 3/2008 | Hecker et al. | |
| 7,380,292 B1 | 6/2008 | Harris | |
| 7,615,109 B2 | 11/2009 | Sepke et al. | |
| 7,823,227 B2 | 11/2010 | Damianoe et al. | |
| 7,913,332 B1 | 3/2011 | Barnhart | |
| 8,083,575 B2 | 12/2011 | Kim | |
| 8,161,579 B2 | 4/2012 | Denkewicz, Jr. et al. | |
| 8,485,131 B2 | 7/2013 | Veness et al. | |
| 8,490,221 B1 | 7/2013 | Conde | |
| 8,828,733 B2 | 9/2014 | Porter et al. | |
| 9,119,748 B2 | 9/2015 | Abraham et al. | |
| 9,266,118 B2 | 2/2016 | Iwaki | |
| 9,612,188 B2 | 4/2017 | Johnston et al. | |
| 9,889,719 B2 | 2/2018 | Isert et al. | |
| 10,881,936 B2 | 1/2021 | Machovina et al. | |
| 11,473,286 B2 | 10/2022 | Machovina et al. | |
| 2002/0069456 A1 | 6/2002 | Kuzniar | |
| 2002/0189008 A1 | 12/2002 | Hipponsteel | |
| 2003/0019019 A1 | 1/2003 | Blanch et al. | |
| 2003/0099575 A1 | 5/2003 | Sung et al. | |
| 2003/0163863 A1 | 9/2003 | Stone | |
| 2003/0177568 A1 * | 9/2003 | Chasen | E03D 9/052 4/213 |
| 2003/0192112 A1 | 10/2003 | Ware | |
| 2005/0166305 A1 * | 8/2005 | Green | A47K 13/307 4/217 |
| 2006/0031979 A1 | 2/2006 | Johnson | |
| 2006/0064803 A1 | 3/2006 | Wang | |
| 2006/0064805 A1 | 3/2006 | Yamamoto et al. | |
| 2006/0182672 A1 | 8/2006 | Hallam | |
| 2006/0195975 A1 | 9/2006 | Kirby | |
| 2007/0234469 A1 | 10/2007 | Denkewicz et al. | |
| 2007/0256219 A1 * | 11/2007 | Ellinger | E03D 9/052 4/213 |
| 2008/0000017 A1 | 1/2008 | Littrell et al. | |
| 2008/0060119 A1 | 3/2008 | Pinizzotto | |
| 2008/0063558 A1 | 3/2008 | Coleman | |
| 2008/0083056 A1 | 4/2008 | Damianoe et al. | |
| 2008/0301865 A1 | 12/2008 | Hand | |
| 2009/0056007 A1 * | 3/2009 | Pham | E03D 9/052 4/347 |
| 2009/0064864 A1 | 3/2009 | Mann et al. | |
| 2009/0158515 A1 | 6/2009 | Bruno | |
| 2009/0233623 A1 | 9/2009 | Lin | |
| 2009/0307831 A1 | 12/2009 | Shahar | |
| 2010/0037679 A1 | 2/2010 | Niezgoda et al. | |
| 2010/0132624 A1 | 6/2010 | Ferrer et al. | |
| 2010/0180830 A1 | 7/2010 | Fritter et al. | |
| 2010/0199413 A1 * | 8/2010 | Pollack | E03D 9/052 4/213 |
| 2010/0235974 A1 | 9/2010 | Reed | |
| 2011/0047686 A1 | 3/2011 | Moore | |
| 2011/0047689 A1 * | 3/2011 | Gianelloni | E03D 9/052 4/348 |
| 2011/0203040 A1 | 8/2011 | Brown | |
| 2012/0042877 A1 | 2/2012 | Wu et al. | |
| 2012/0186007 A1 | 7/2012 | Perez | |
| 2013/0047858 A1 | 2/2013 | Bohlen et al. | |
| 2013/0152790 A1 | 6/2013 | Ingledew et al. | |
| 2013/0160197 A1 * | 6/2013 | Conley | F24F 7/065 4/347 |
| 2013/0205484 A1 | 8/2013 | Taciuc | |
| 2013/0269091 A1 * | 10/2013 | Sollami | A47K 13/307 4/213 |
| 2014/0059750 A1 | 3/2014 | Bochnik | |
| 2014/0137317 A1 * | 5/2014 | Sollami | E03D 9/05 4/213 |
| 2014/0298576 A1 | 10/2014 | Gallardo Chaparro et al. | |
| 2014/0304903 A1 * | 10/2014 | Cogswell | E03D 9/052 4/314 |
| 2014/0331625 A1 | 11/2014 | Gruenbacher et al. | |
| 2015/0098860 A1 | 4/2015 | Aldereguia et al. | |
| 2016/0010318 A1 * | 1/2016 | Sollami | A47K 13/307 4/213 |
| 2016/0223548 A1 | 8/2016 | Kizuka et al. | |
| 2016/0245784 A1 | 8/2016 | Matocha et al. | |
| 2016/0250370 A1 | 9/2016 | Orito et al. | |
| 2016/0286971 A1 | 10/2016 | Pan | |
| 2016/0325606 A1 | 11/2016 | Kim et al. | |
| 2016/0361677 A1 | 12/2016 | Blackley | |
| 2017/0014009 A1 | 1/2017 | Smith | |
| 2017/0036516 A1 | 2/2017 | Kim et al. | |
| 2017/0107709 A1 | 4/2017 | Kausch et al. | |
| 2018/0154297 A1 | 6/2018 | Maletich et al. | |
| 2018/0250430 A1 | 9/2018 | Machovina et al. | |
| 2019/0218762 A1 * | 7/2019 | Machovina | B01D 53/02 |

(56) References Cited

U.S. PATENT DOCUMENTS

| | | | | |
|---|---|---|---|---|
| 2019/0292760 A1* | 9/2019 | Finkbeiner | ............ | E03D 9/052 |
| 2023/0038314 A1* | 2/2023 | Machovina | ............... | A61L 2/10 |

FOREIGN PATENT DOCUMENTS

| | | | | |
|---|---|---|---|---|
| DE | 4009162 | 11/1990 | | |
| EP | 0748902 | 12/1996 | | |
| EP | 3037594 | 6/2016 | | |
| EP | 3847316 | 7/2021 | | |
| JP | 1999501372 | 2/1999 | | |
| JP | 2000160628 | 6/2000 | | |
| JP | 2001262663 | 9/2001 | | |
| JP | 2021536331 | 12/2021 | | |
| KR | 100968504 | 7/2010 | | |
| WO | WO2006041836 | 4/2006 | | |
| WO | WO2009130884 | 10/2009 | | |
| WO | WO-2010091390 A2 * | 8/2010 | ............ | E03D 9/052 |
| WO | WO2013061181 | 5/2013 | | |
| WO | WO2015109406 | 7/2015 | | |
| WO | WO2017104927 | 6/2017 | | |
| WO | WO2018009715 | 1/2018 | | |
| WO | WO2018160835 | 9/2018 | | |
| WO | WO2020050911 | 3/2020 | | |
| WO | WO-2020050911 A1 * | 3/2020 | ............ | A61L 9/014 |
| WO | WO-2023049436 A1 * | 3/2023 | ............ | A47K 13/30 |

OTHER PUBLICATIONS

Capelli et al., Electronic Noses for Environmental Monitoring Applications, Oct. 24, 2014.

Robert Clain, ECE 4760: Introduction Microcontroller Programming Final Design Project, Jan. 1, 2009.

Daikin Industries, LTD, Air Purifier Operational Manual, Mar. 4, 2011.

Fuchs et al., Evaluation of Unpleasant Odor with a Portable Electronic Nose, Oct. 17, 2007.

Kwiatkowska-Stenzel et al., Analysis of Noxious Gas Pollution in Horae Stable Air, Jul. 29, 2013.

Lim et al., Odor and Gas Release from Anaerobic Treatment Lagoons for Swine Manure, Mar. 1, 2003.

Mackie et al., Biochemical Identification and Biological Origin of Key Odor Components in Livestock Waste, Jun. 1, 1998.

Moore et al., Gas-Chromatographic and Mass-Spectrometric Analysis of the Odor of Human Feces, Jan. 1, 1987.

Ortiz Perez et al., Low-Power Odor-Sensing Network Based on Wake-Up Node, Aug. 25, 2017.

Ortiz Perez et al., Odor-Sensing System to Support Social Participation of People Suffering from Incontinence, Jan. 1, 2007.

Pan et al., A New Intelligent Electronic Nose System for Measuring and Analysing Livestock and Poultry Farm Odours, Dec. 1, 2007.

Pandey et al., Human Body-Odor Components and Their Determination, Jan. 1, 2011.

Qu G. et al., Development of an Integrated Sensor to Measure Odors, Sep. 1, 2008.

Schiffman et al., Dispersion Modeling to Compare Alternative Technologies for Odor Remediation at Swine Facilities, Sep. 1, 2008.

Yoon et al., A Study of Odor Emission Characteristics from Human Waste/Livestock Manure Treatment Facilities in Korea, Aug. 20, 2014.

* cited by examiner

PORTABLE AIR FILTRATION ASSEMBLY FOR TOILETS

CLAIM OF PRIORITY

The present application is based on, and a claim of priority is made under 35 U.S.C. Section 119(e) to a provisional patent application in the U.S. Patent and Trademark Office, namely, that having Ser. No. 63/307,330 and a filing date of Feb. 7, 2022, and which is incorporated herein by reference.

BACKGROUND OF THE INVENTION

Field of the Invention

This invention is directed to an assembly for the filtration and other processing of air and aerosolized fluid issuing from the interior of a toilet bowl.

Description of the Related Art

The odor of human waste released by people into a toilet bowl can enter the general surrounding area and remain suspended during toilet use and for periods of time post toilet use. This can be unpleasant to the present toilet user, to others located in the nearby environment, or to others that enter the area later to use the same toilet.

Air purifiers and air filters are widely used in interior spaces such as homes and offices to minimize the amount of dust, allergens, and micro-organisms that are present in the air. These systems typically include a fan for circulating air and a mechanical filter disposed in an air path to filter or purify air flowing there through. Larger fans, air purifiers and/or air filters tend to be more effective due to the large volume of air they can remove, filter and/or purify at a given time. However, larger units of this type are usually obtrusive and take up a considerable amount of space in the home or office. Further, these larger systems may require more electricity and are often loud due to the size of the fans included in the system.

Although fans, air purifiers and air filters may provide a solution to combating the presence of contaminants such as dust, allergens and micro-organisms, they may lack the means to effectively remove the odors from the air. Individuals are well aware of the offensive odors that may be released from flatulence, feces, or urine. These odors can be disruptive and unpleasant to individuals located in the vicinity of such odors. When unpleasant odors are present in the air, individuals usually commonly use air freshener sprays, plug in air fresheners or the like, to "cover-up" the unpleasant odor with a more pleasant scent. However, this tactic merely masks the presence of the unpleasant odor and does nothing to actually remove the odor.

Additionally, the use of air fresheners or sprays presents an unfortunate problem because an individual must first come in contact with the unpleasant odor before these devices can be used to mask the scent. Furthermore, while the scent of air fresheners, sprays, etc. may provide a more pleasant odor, as compared to odors released from flatulence, feces or urine, some individuals May not enjoy still not enjoy or even be able to tolerate such fragrances.

Accordingly, there is a need for an air filter and/or odor processing assembly and/or system operative to withdraw, filter and otherwise treat or process odors, specifically including those emanating from flatulence, defecation and/or urination, directly from a toilet bowl airspace. Treatment of such odors thereby eliminate or significantly reduce the release thereof into the surrounding airspace. Such processing and/or treatment of such odors may include passing air or aerosolized fluid containing such odors across a filter assembly operatively structured to absorb the odors. In addition, a proposed assembly and/or system of the type referred to may also include a filter assembly capable of removing aerosolized particles contained in a "toilet plume".

Moreover, the treatment or processing of fluid removed from the interior of a toilet bowl May also include sterilizing capabilities operative to remove germs, bacteria, etc. prior to reaching the air or space surrounding the toilet. In addition, modification of certain structural and operative features may serve to enhance the versatility of an improved odor elimination assembly and/or system, thereby enabling its use in both domestic and commercial environments. Finally, a proposed and improved toilet odor processing assembly and or system which overcomes known disadvantages of the type set forth above, should be designed to be inexpensive, easily serviceable and convenient enough to change install and maintain.

SUMMARY OF THE INVENTION

The present invention is directed to an electrically powered, portable air filtration and sterilization assembly, when in use is operatively disposed immediately adjacent to a toilet. As such, it is usable and/or attachable to a majority of existing 2-tank toilet or commercial vacuum flow toilet designs and requires no replacement of the toilet, seat or other mechanical modification of the toilet structure itself. As explained in greater detail hereinafter, the assembly comprises a plurality of interactive, operative components including a housing, a filter assembly disposed in the housing, a fan assembly and an activating switch or member.

In more specific terms, the portable filter assembly of the present invention includes a housing operatively disposable immediately adjacent to the toilet bowl and including a housing inlet and a housing outlet. In use and when operatively disposed, the inlet is positioned in direct fluid communication with an interior of the toilet bowl. To facilitate such direct fluid communication, the inlet comprises a substantially "snout" like structure having an elongated configuration extending outwardly from a remainder of the housing and preferably, but not necessarily, located at an outer or upper end of the housing. The elongated yet relatively small transverse dimension or "thickness" of the snout-like inlet is dimensioned to be disposed above the outer rim of the toilet bowl contiguous to the toilet bowl opening and beneath a toilet seat, when the seat is disposed in a closed relation resting on the toilet bowl rim. The outer end of the inlet includes an inlet port which at least partially defines the aforementioned direct fluid communication with the interior of the toilet bowl.

The portable filter assembly of the present invention further includes a filter assembly disposed within the housing in direct fluid communication and downstream of the inlet. In addition, a fan assembly is operatively associated with a self-contained electrical power source specifically including, but not limited to at least one battery and/or a rechargeable battery (AA, AAA or 232 style battery). Also, one embodiment of the portable filtering assembly of the present invention includes an activating switch or like structure which when manually or otherwise engaged will serve to operatively interconnect the power source to the fan assembly causing an at least partially continuous but more practically intermittent operation, as explained hereinafter.

Therefore, activation of the fan assembly creates and directs a predetermined path of fluid flow or "fluid flow" through the housing. More specifically, the fluid flow is directed successively through and from the inlet, through the filter assembly, located in communication with the inlet but downstream thereof, and therefrom to an exterior of the housing through the aforementioned housing outlet.

Additional structural features of one or more embodiments of the portable filter assembly of the present invention include the housing comprising a first housing section or base and a second housing section. The first and second housing sections are removably attached to one another in a fluid sealing connection. As should be apparent, the fluid sealing connection between the first and second housing sections facilitates a stabilized or more defined fluid flow of air collected from the interior of the toilet bowl and passing into the interior of the housing through the inlet. Absent the fluid sealing connection between the first and second sections of the housing, leakage or intake of air from an exterior of the housing could possibly enter the housing and pass into the fluid flow. In turn, this may result in a less efficient processing of air collected through the inlet from the interior of the toilet bowl.

Further structural and operative features of the present invention include the aforementioned filter assembly capable of being removed and replaced from its position on or within the removable second housing section. This facilitates access to the filter assembly for removal, repair or replacement thereof thereby allowing repetitive use of the housing by a replacement of the filter assembly when required. Additional details of the filter assembly include a multi-segmented construction structured to remove odors, as well as aerosolized waste and pathogens from the fluid flow passing into the housing through the inlet, which originates from the "air" within the interior of the toilet bowl. More specifically, the multi-segmented construction of the filter assembly comprises a carbon-based filter segment and also may comprise an HEPA filter segment.

For purposes of structural convenience and operability the aforementioned inlet is also connected to and may define and integral portion of the second section of the housing, such that the inlet is removable with the remainder of the second section as it is detached from its fluid sealing connection with the first section of the housing.

Yet additional structural features of the first and second housing sections being removably connected in a fluid sealing connection includes the ability to establish a variably spaced disposition between the first and second housing sections while concurrently maintaining the fluid sealing connection. As set forth herein, and operative disposition of the housing may include it being disposed immediately adjacent to the toilet bowl concurrently to the inlet disposed between the outer rim of the toilet bowl and the under portion of the toilet seat when closed. It is of course recognized that toilet bowls may come in various dimensions and configurations, including having different heights relative to the supporting floor or other supporting surface. Therefore, the variably spaced disposition of the second section of the housing relative to the first section of the housing allows the establishment of a variable height of the housing. Therefore, when the housing is supported on a common supporting surface or floor of the toilet bowl, the height of the housing may be adjusted or varied to facilitate the proper positioning of the snout-like inlet in the intended area between the toilet seat and the surrounding rim of the toilet bowl. As intended, such intended positioning of the inlet facilitates direct fluid communication thereof with the interior of the toilet bowl. In turn, the passage of the odorized and/or partially polluted air from the interior of the toilet bowl, resulting from toilet usage, will pass into the housing through the inlet and be directed with the aforementioned fluid flow through the housing to the outlet thereof.

In one or more embodiments of the portable filtering assembly of the present invention, the aforementioned activating switch may be in the form of a button or other structure capable of manual manipulation. Further, in at least one embodiment the activating switch or button may be connected directly on or to the housing in a readily accessible location to a user and be hardwired to operatively connect and disconnect the aforementioned power source to the fan assembly. In contrast, one embodiment of the present invention may include the activating switch or member being operative wirelessly such as by RF transmission, Bluetooth, etc. Therefore, in this wireless embodiment the activating switch may be remotely located a spaced distance from the housing, yet still in a readily accessible location. In either of these two structurally modified embodiments, the pressing or otherwise activating of the activating switch, while the fan is turned off, will serve to turn the fan on for a given period of time, thereby causing the fan assembly to establish the aforementioned fluid flow through the housing. A subsequent pressing or otherwise activation of the activating switch, while the fan assembly is operating, will result in a stopping or shut off of the fan assembly, such as when a user of the toilet is finished and sufficient fluid flow through the housing has been established to remove odors, aerosolized waste, pathogens, etc. From the "air" within the interior of the toilet bowl. As a further structural and operative variation, the activating switch or member May have incorporated therein a motion detector/sensor structure, operative to eliminate the need for manual pressing or contact but responsive to the movement of a hand, etc. over and in observable relation to the motion detector/sensor.

The versatility of the portable filtering assembly of the present invention is further demonstrated by the inclusion of an overflow discharge structure or assembly incorporated within the housing. As a result, the housing and the entirety of the assembly itself is substantially protected against significant damage when the toilet bowl overflows, as is not uncommon, particularly in a domestic environment. In more specific terms, overflow of the toilet bowl may result in toilet water, as versus air, passing into and through the inlet and into the interior of the housing. During such relatively abnormal conditions, the water will be allowed to pass into and through the inlet and possibly downstream through the filter assembly to a diversion structure or path. In addition, a discharge port will be mounted on or connected to the housing in fluid communication with the diversion path or structure for the overflow liquid water. Therefore, the water will be directed downstream of the filter assembly to the discharge port, via the diversion path or structure, and there from through the discharge port to an exterior of the housing.

Moreover, in order to prevent or significantly restrict inadvertent leakage of air into the interior of the housing, thereby possibly, at least partially corrupting the aforementioned fluid flow of air from the interior of the toilet bowl, a valve structure is disposed in flow restricting relation to the discharge port. The valve structure may include, but not be limited to, a check valve is disposed in direct fluid restrict in relation to the discharge port. Such valve structure and/or check valve will allow the exiting of the overflow water from the housing, through the discharge port but prevent or significantly restrict the entrance of air from an exterior of the housing and outside of the toilet bowl from entering into the interior thereof and into the intended fluid flow, as set forth above.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
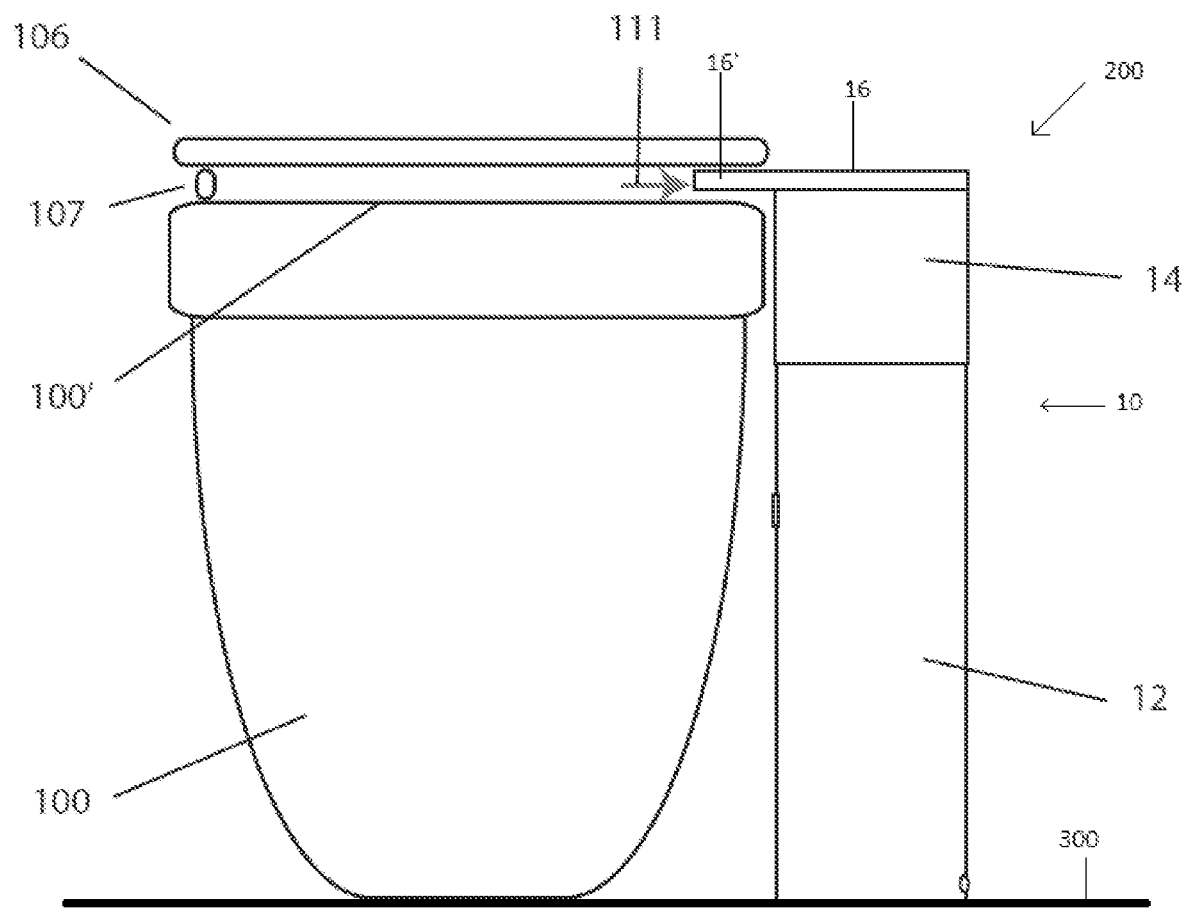
FIG. 1 is a front view of a toilet bowl with the portable filter assembly of the present invention disposed in an operative position relative thereto.
Figure 2:
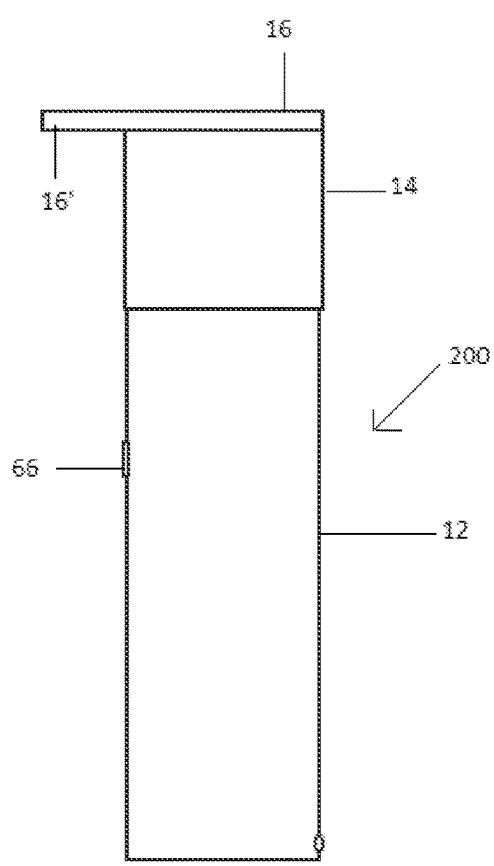
FIG. 2 is a side view of the embodiment of the portable filter assembly is represented in FIG. 1.

The portable filter assembly of the present invention is generally represented as 200 throughout the Figures and includes a housing generally indicated as 10 which, when in use, is operatively disposable immediately adjacent to the toilet bowl 100 as represented in at least FIG. 1. While the structure and operative components associated with the toilet bowl 100 may vary, for purposes of clarity, FIG. 1 represents the toilet bowl 100 including an upper and outer rim 100' disposed in substantially surrounding relation to the interior of the toilet bowl 100. In addition, a toilet seat 106 is represented in a "closed" position such that it overlies and is supported by the rim 100' in spaced relation thereto by a bumper or spacer 107.

Figure 3:
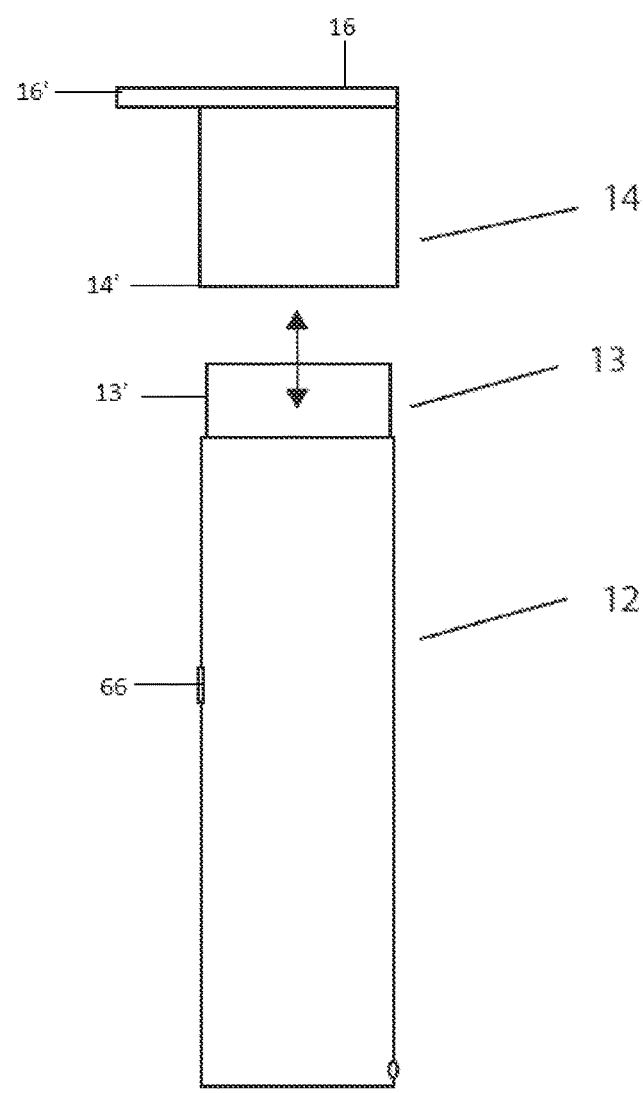
FIG. 3 is a side view of the embodiment of FIG. 2 with the first and second sections of the housing removably connected to one another.

The housing 10 includes a first section or base 12 and a second section 14 which may be removably attached to one another by a fluid sealing connection 13 as represented in FIG. 3 as discussed in greater detail hereinafter. Further, the housing 10 includes a housing inlet 16 and a housing outlet 18. In use and when the housing 10 is operatively disposed, the inlet 16 is positioned in direct fluid communication with an interior of the toilet bowl. Again, with primary reference to FIG. 1, to facilitate direct fluid communication with the interior of the toilet bowl 100, the inlet 16 comprises a substantially "snout" like structure having an elongated configuration extending outwardly from a remainder of the housing 10 and preferably, but not necessarily, located at an outer or upper end of the housing 10 as represented throughout the Figures. The elongated yet relatively small transverse dimension or "thickness" of the snout-like inlet 16 is dimensioned to be disposed above the outer rim 100' of the toilet bowl 100 which surrounds the toilet bowl opening and interior (not shown for purposes of clarity) and beneath a toilet seat 106, when the seat 106 is disposed in a closed relation resting on the toilet bowl rim 100', via spacer or bumper 107. The outer end of the inlet 16 includes an inlet port 16' which at least partially defines the aforementioned direct fluid communication 111 with the interior of the toilet bowl 100.

The portable filter assembly 200 a filter assembly 20 disposed within the housing 10 in direct fluid communication and downstream of the inlet 16. In addition, a fan assembly 28 is operatively associated with a self-contained electrical power source 30 specifically including, but not limited to at least one battery and/or a rechargeable battery (AA, AAA or 232 style battery). Also, one embodiment of the portable filtering assembly 200 includes an activating switch, member or like structure 34 which when manually or otherwise engaged will serve to operatively interconnect the power source 30 to the fan assembly 28 causing an at least partially continuous but more practically in an on-off intermittent operation, as explained hereinafter.

Therefore, activation of the fan assembly 28 creates and directs a predetermined path of fluid flow or "fluid flow" schematically represented by directional arrows 50 through the housing 10. More specifically, the fluid flow 50 is directed successively through and from the inlet 16, through the filter assembly 20, located in communication with the inlet 16 and downstream thereof, and therefrom to an exterior of the housing 10 through the aforementioned housing outlet 18, as that 50' in FIG. 4.

As set forth herein, additional structural features of one or more embodiments of the portable filter assembly 200 include the housing 10 comprising the first housing section or base 12 and the second housing section 14. As also indicated, the first and second housing sections 12 and 14 are removably attached to one another in a fluid sealing connection, as at 13 in FIG. 3. The fluid sealing connection 13 between the first and second housing sections 12 and 14 facilitates a stabilized or more defined fluid flow of air 50 collected from the interior of the toilet bow 100 and passing into the interior of the housing 10 through the inlet 16. Absent this fluid sealing connection 13, leakage or intake of air from an exterior of the housing 10, other than from the interior of the toilet bowl 100, could possibly enter the housing 10 and pass into the fluid flow 50. In turn, such interior leakage may result in a less efficient processing of air collected through the inlet 16 from the interior of the toilet bowl 100.

Further structural and operative features of the present invention include the aforementioned filter assembly 20 capable of being removed and replaced from its position on or within the removable second housing section 14. This facilitates access to the filter assembly 20 for removal, repair or replacement thereof thereby allowing repetitive use of the housing 10 by a replacement of the filter assembly 20 when required. Additional details of the filter assembly 20 include a multi-segmented construction structured to remove odors, as well as aerosolized waste and pathogens from the fluid flow 50 passing into the housing 10 through the inlet 16, which originates from the "air" within the interior of the toilet bowl 100. More specifically, the multi-segmented construction of the filter assembly 20 comprises a carbon-based filter segment 20' and also may comprise an HEPA filter segment 20".

For purposes of structural convenience and operability the aforementioned inlet 16 is also connected to and may define and integral portion of the second section 14 of the housing 10, such that the inlet 16 is movable with the remainder of the second section 14 as it is detached from its fluid sealing connection 13 with the first section 12 of the housing 10.

Yet additional structural features of the first and second housing sections 12 and 14 being removably connected in a fluid sealing connection 13 includes the ability to establish a variably spaced disposition between the first section 12 and the second section 14 while concurrently maintaining the aforementioned fluid sealing connection 13. As set forth herein and represented in FIG. 1, and operative disposition of the housing 10 may include it being disposed immediately adjacent to the toilet bowl 100 concurrently to the inlet 16 disposed between the outer rim 100' of the toilet bowl 100 and the under portion of the toilet seat 106 when closed. It is of course recognized that toilet bowls may come in various dimensions and configurations, including having different heights relative to a supporting floor or other supporting surface 300. Therefore, the variably spaced disposition of the second section 14 of the housing 100 relative to the first section 12 of the housing 10 allows the establishment of a variable height of the housing 10.

More specifically, as represented in FIG. 3 the second section 14 is represented as being completely removed from the first section 12. However, the fluid sealing connection 13, including an exterior surface 13' thereof, is cooperatively dimensioned, configured and structured to be inserted within the interior of the second section 14 through the open and 14'. Such insertion may include a sliding engagement with the exterior surface 13' with the interior surface of the second section 14 contiguous or adjacent to the open and 14'. Accordingly, the aforementioned fluid sealing connection 13 will be maintained as long as the exterior surface 13' is disposed within the interior of the second section 14 and in sealing and possibly sliding engagement with the interior surface of second section 14.

Therefore, when the housing 10 is supported on a common supporting surface or floor 300 of the toilet bowl 100, the height of the housing 10 may be adjusted or varied, at least partially due to the inlet 16 movable with the second section 14, to facilitate the proper positioning of the snout-like inlet 16 in the intended area between the toilet seat 106 and the surrounding rim 100' of the toilet bowl 100. As intended, such intended positioning of the inlet 16 facilitates direct fluid communication 111 with the interior of the toilet bowl 100. In turn, the passage of the odorized and/or partially polluted air 111 (see FIG. 1) from the interior of the toilet bowl 100, resulting from toilet usage, will pass into the housing 10 through the inlet 16 and be directed with and along the aforementioned fluid flow 50 through the housing 10 to the outlet thereof 18, where it exits through outlet 18.

In one or more embodiments of the portable filtering assembly 200, the aforementioned activating switch 34 (see FIG. 4) may be in the form of a button or other structure capable of manual manipulation. Further, in at least one embodiment the activating switch or button 34 may be connected directly on or to the housing 10 in a readily accessible location to a user and be hardwired to operatively connect and disconnect the aforementioned power source 30 to the fan assembly 28. In contrast, one embodiment of the present invention may include the activating switch or member being operative wirelessly such as by RF transmission, Bluetooth, etc. Therefore, in this wireless embodiment the activating switch 34 may be remotely located a spaced distance from the housing 10, yet still be in a readily accessible location. In either of these two structurally modified embodiments, the pressing or otherwise activating of the activating switch 34, while the fan assembly 28 is turned off, will serve to turn the fan assembly 28 on for a given period of time, thereby causing the fan assembly 28 to establish the aforementioned fluid flow 50 through the housing 10. A subsequent pressing or otherwise activation of the activating switch 34, while the fan assembly 28 is operating, will result in a stopping or shut off of the fan assembly 28, such as when a user of the toilet is finished and sufficient fluid flow 50 through the housing 10 has been established to remove odors, aerosolized waste, pathogens, etc. From the "air" within the interior of the toilet bowl. As a further structural and operative variation, the activating switch or member 34 may have a motion detector/sensor structure incorporated therein and be operative to eliminate the need for manual pressing or contact, but responsive to the movement of a hand, etc. over and in observable relation to the motion detector/sensor.

Figure 4:
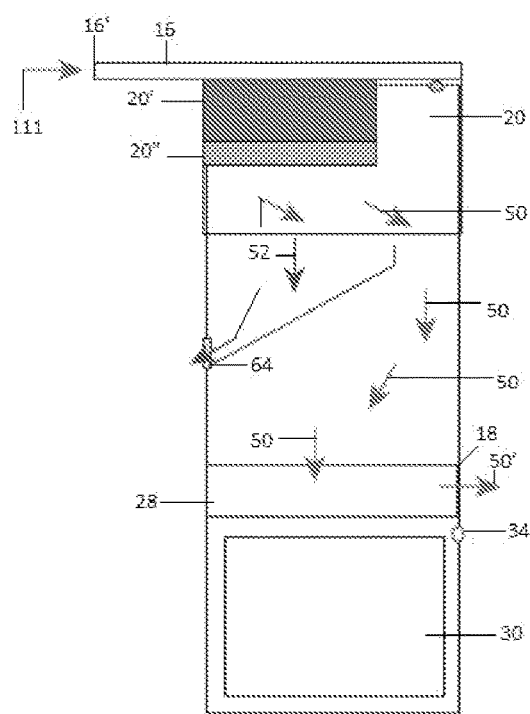
FIG. 4 is an interior view of the portable filter assembly of the embodiment of FIGS. 1-3, schematically representing fluid flow therethrough.
Figure 5:
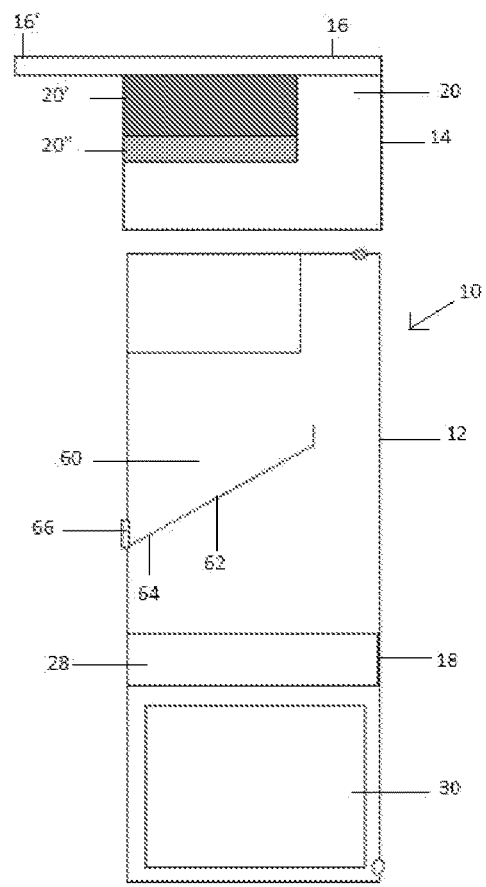
FIG. 5 is an interior view of the embodiment of FIG. 3.

With primary reference to FIGS. 4 and 5, the versatility of the portable filtering assembly 200 is further demonstrated by the inclusion of an overflow discharge structure or assembly, generally indicated at 60, incorporated within the housing 10. As a result, the housing 10 and at least a majority of the portable filtering assembly 200 is substantially protected against significant damage when the toilet bowl 100 overflows. In more specific terms, overflow of the toilet bowl 100 may result in toilet water, schematically represented by arrows 52, passing into and through the inlet 16 and into the interior of the housing 10 as represented in FIG. 4. During such relatively abnormal conditions, the water flow 52 will be allowed to pass into and through the inlet 16 and possibly downstream through the filter assembly 20 to a diversion structure or path, generally indicated as 62. In addition, a discharge port 64 will be mounted on or connected to the housing 10 in fluid communication with the diversion path or structure 62 for the overflow liquid water 52. Therefore, the overflow water 52 will be directed downstream of the filter assembly 20 to the discharge port 64, via the diversion path or structure 62, and therefrom through the discharge port 64 to an exterior of the housing 10.

Moreover, in order to prevent or significantly restrict inadvertent leakage of air into the interior of the housing 10, thereby possibly, at least partially corrupting the aforementioned fluid flow of air 50 from the interior of the toilet bowl 100, a valve structure 66 is disposed in flow restricting relation to the discharge port 64. The valve structure 66 may include, but not be limited to, a check valve disposed in direct fluid restricting in relation to the discharge port 64. Such valve structure 64 and/or check valve will allow the exiting of the overflow water 52 from the interior of the housing 10, through the discharge port 64, but prevent or significantly restrict the entrance of air from an exterior of the housing 10, which originates outside of the toilet bowl 100 from entering into the interior of the housing 10 and into the intended fluid flow 50, as set forth above.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A portable assembly for filtering toilet bowl orders and aerosolized toilet waste comprising:
 a housing operatively disposed adjacent a toilet bowl and including an inlet and an outlet, the housing including a first section and a second section adjustably attached in a fluid sealing connection with one another, the fluid sealing connection including a variably spaced disposition of said second section relative to said first section, said inlet operatively disposed in direct fluid communication with an interior of the toilet bowl, a filter assembly disposed within said housing in fluid communication with said inlet, a fan assembly including a power source; said fan assembly disposed within said housing and operative to direct fluid flow therethrough, said fluid flow directed successively through and from said inlet, through said filter assembly and to an exterior of said housing through said outlet, concurrent to activation of said fan assembly.

2. The portable assembly as recited in claim 1 wherein said inlet comprises an elongated configuration extending outwardly from said housing into an operative position above a rim and beneath a seat of the toilet bowl.

3. The portable assembly as recited in claim 1 wherein said filter assembly is movable with and connected to said second section.

4. The portable assembly as recited in claim 3 wherein said inlet is connected to and movable with said second section.

5. The portable assembly as recited in claim 1 wherein said power source comprises a self-contained power source connected to said housing.

6. The portable assembly as recited in claim 5 wherein said self-contained power source comprises a rechargeable battery.

7. The portable assembly as recited in claim 1 further comprising an activating switch selectively operative to connect said power source to said fan assembly.

8. The portable assembly as recited in claim 7 wherein said activating switch is mounted on said housing.

9. The portable assembly as recited in claim 7 wherein said activating switch is operative wirelessly.

10. The portable assembly as recited in claim 9 wherein said activating switch is disposed remotely from said housing.

11. The portable assembly as recited in claim 1 wherein said filter assembly comprises a multi-segmented construction structured to remove odors, aerosolized waste and pathogens from said fluid flow.

12. The portable assembly as recited in claim 11 wherein said multi-segmented construction comprises a carbon-based filter segment.

13. The portable assembly as recited in claim 12 wherein said multi-segmented construction comprises an HEPA filter segment.

14. The portable assembly as recited in claim 11 wherein said multi-segmented construction comprises an HEPA filter segment.

15. A portable assembly as recited in claim 1 wherein said variably spaced disposition of said second section relative to said first section at least partially defines a variable height of said housing inset operative disposition adjacent the toilet bowl.

16. A portable assembly for filtering toilet bowl orders and aerosolized toilet waste comprising:

a housing operatively disposed adjacent a toilet bowl and including an inlet and an outlet, the housing including a first section and a second section adjustably attached in a fluid sealing connection with one another, the fluid sealing connection including a variably spaced disposition of said second section relative to said first section, said inlet operatively disposed in direct fluid communication with an interior of the toilet bowl, a filter assembly disposed within said housing in fluid communication with said inlet, a fan assembly including a power source; said fan assembly disposed within said housing and operative to direct fluid flow therethrough said fluid flow directed successively through and from said inlet, through said filter assembly and to an exterior of said housing through said outlet, concurrent to activation of said fan assembly, and a discharge port disposed in fluid communicating relation between an interior and an exterior of said housing; said discharge port disposed in structured to direct liquid flow, from said inlet, to the exterior of said housing.

17. A portable assembly as recited in claim 16 further comprising a valve structure disposed in fluid communication with said discharge port and structured to restrict fluid flow from an exterior of said housing to an interior said housing through said discharge port.

18. A portable assembly as recited in claim 16 wherein said variably spaced disposition of said second section relative to said first section at least partially defines a variable height of said housing inset operative disposition adjacent the toilet bowl.

\* \* \* \* \*